United States Patent
Zhang

(10) Patent No.: US 10,737,617 B2
(45) Date of Patent: *Aug. 11, 2020

(54) DETECTING METHOD FOR FRONT-PARKED VEHICLES AT NIGHT

(71) Applicant: Guobiao Zhang, Corvallis, OR (US)

(72) Inventor: Guobiao Zhang, Corvallis, OR (US)

(73) Assignees: HangZhou HaiCun Information Technology Co., Ltd., HangZhou, ZheJiang (CN); Guobiao Zhang, Corvallis, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,914

(22) Filed: Sep. 8, 2019

(65) Prior Publication Data

US 2019/0389380 A1 Dec. 26, 2019

Related U.S. Application Data

(63) Continuation-in-part of application No. 15/628,617, filed on Jun. 20, 2017, now Pat. No. 10,075,590, which is a continuation of application No. 15/260,277, filed on Sep. 8, 2016, now Pat. No. 9,688,197, which is a continuation of application No. 14/636,323, filed on Mar. 3, 2015, now Pat. No. 9,475,429.

(30) Foreign Application Priority Data

Jul. 26, 2018 (CN) .......................... 2018 1 0829696
Jul. 26, 2018 (CN) .......................... 2018 1 0830067

(51) Int. Cl.
*B60Q 9/00* (2006.01)
*G06K 9/00* (2006.01)
*B60R 1/00* (2006.01)

(52) U.S. Cl.
CPC ................ B60Q 9/002 (2013.01); B60R 1/00 (2013.01); G06K 9/00812 (2013.01); *B60R 2300/106* (2013.01); *B60R 2300/806* (2013.01)

(58) Field of Classification Search
CPC ...... B60Q 9/002; B60R 1/00; G06K 9/00785; G06K 9/00812; G08G 1/14; G08G 1/141; G08G 1/142; G08G 1/147; G08G 1/04; G08G 1/056; G08G 1/48; H04M 3/51; H04M 3/5158
USPC .................. 340/425.5, 435, 436, 458, 932.2; 348/148, 149; 705/13
See application file for complete search history.

(56) References Cited

U.S. PATENT DOCUMENTS

| | | | |
|---|---|---|---|
| 4,891,624 A * | 1/1990 | Ishikawa | G01S 17/931 340/436 |
| 8,139,115 B2 | 3/2012 | Barnes et al. | |
| 8,698,652 B1 | 4/2014 | Zhang | |
| 8,923,565 B1 | 12/2014 | Zhang | |
| 9,475,429 B2 | 10/2016 | Zhang | |
| 2009/0243889 A1* | 10/2009 | Suhr | G06K 9/00812 340/932.2 |

(Continued)

*Primary Examiner* — Hung T Nguyen

(57) ABSTRACT

To detect front-parked vehicles at night (i.e. a vehicle is parked with its head facing the inside of a parking space), a detection device uses the light beam from a passing-by vehicle to extract at least a reflection of at least a tail light or at least a portion of a back bumper from an image captured for a parking space.

10 Claims, 8 Drawing Sheets

(56) References Cited

U.S. PATENT DOCUMENTS

2013/0013932 A1   1/2013  Kong et al.
2014/0022068 A1*  1/2014  Usami .................... B60Q 1/143
                                                340/436

* cited by examiner

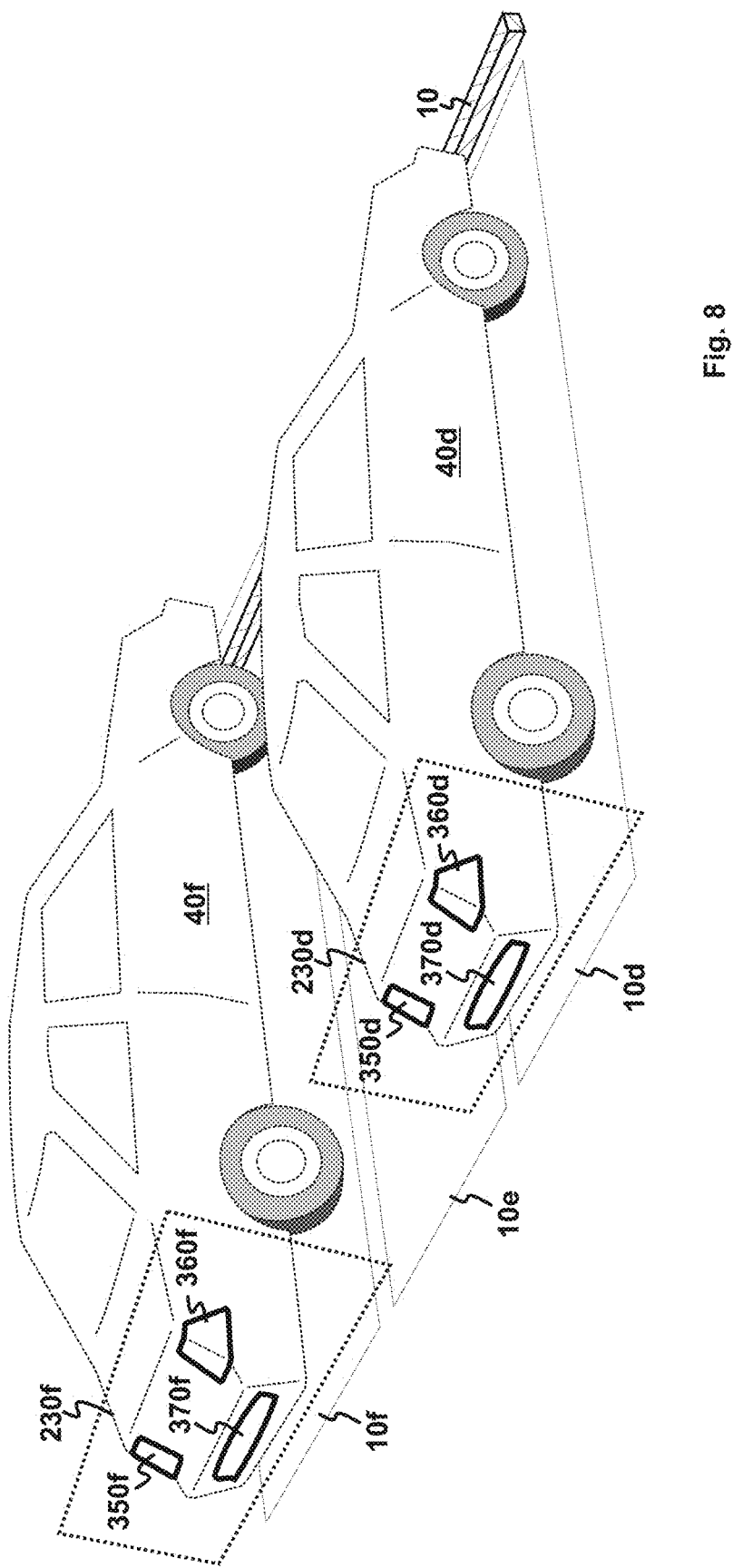

DETECTING METHOD FOR FRONT-PARKED VEHICLES AT NIGHT

CROSS-REFERENCE TO RELATED APPLICATIONS

This is a continuation-in-part of application "Night Detection of Side-by-Side Parked Vehicles", application Ser. No. 15/628,617, filed Jun. 20, 2017, now U.S. Pat. No. 10,075,590 which is a continuation-in-part of application ""Night Detection of Parked Vehicles", application Ser. No. 15/260,277, filed Sep. 8, 2016, now U.S. Pat. No. 9,688,197, which is a continuation of application "Night Detection of Parked Vehicles", application Ser. No. 14/636,323, filed Mar. 3, 2015, now U.S. Pat. No. 9,475,429.

BACKGROUND

1. Technical Field of the Invention

The present invention relates to the field of electronics, and more particularly to device and method to detect parked vehicles at night.

2. Prior Art

Locating a vacant parking space causes much frustration to motorists. It increases fuel consumption and has a negative impact to the environment. To conserve energy resources and enhance the quality of the environment, it is highly desired to develop a parking-monitoring system, which can transmit substantially real-time parking states (i.e. occupied or vacant) to motorists. Based on the parking states, a motorist can be guided towards a vacant parking space at destination.

Parking enforcement is an important aspect of city management. The current parking-enforcement system is patrol-based, i.e. parking enforcement officers patrol the streets and/or parking lots to enforce the parking regulations. This operation requires significant amount of man-power and also consumes a lot of fuel. It is highly desired to take advantage of the above-mentioned parking-monitoring system and automatically measure the parking time for each monitored parking space.

Both parking monitoring and enforcement are based on parked vehicle detection. Parked vehicle detection preferably can be carried out both during the day and at night. This is particularly important for commercial districts during the day and for residential areas at night. Relying on the natural light to capture the images of a parking area, prior art devices only work during the day. At night, because street lights generally do not provide adequate lighting coverage (often blocked by trees or other obstacles), prior art devices cannot reliably detect parked vehicles.

OBJECTS AND ADVANTAGES

It is a principle object of the present invention to conserve energy resources and enhance the quality of the environment.

It is a further object of the present invention to reliably detect parked vehicles at night.

It is a further object of the present invention to provide parking monitoring at night.

It is a further object of the present invention to provide parking enforcement at night.

In accordance with these and other objects of the present invention, the present invention discloses a device and method to detect parked vehicles at night.

SUMMARY OF THE INVENTION

The present invention discloses a night-detection device for parked vehicles. It uses the light beam from a passing-by vehicle to detect parked vehicles. The night-detection device comprises a parked-vehicle sensor for monitoring a parking area and a moving-vehicle sensor for sensing a moving vehicle around the parking area. The parked-vehicle sensor captures the images of the parking area when the moving-vehicle sensor detects a passing-by vehicle. These images are then processed to determine the state of each parking space in the parking area.

Because it has a limited range (with effective range of ~20 meters), the light beam of the passing-by vehicle can only illuminate a small number of the parked vehicles (typically around three vehicles). Considering that the passing-by vehicle can only illuminate the parking area for a few seconds, the parked-vehicle sensor needs to capture at least one image every two seconds. This is more frequent than that during the day when the parked-vehicle sensor only needs to capture an image every five to ten seconds. Accordingly, for a parked-vehicle sensor with a powerful processor, the images can be processed in real time; for a parked-vehicle sensor with a less powerful processor, the images can be recorded first and then processed after the moving vehicle is out of range.

Because the parked vehicles are illuminated by the light beam of a passing-by vehicle, not by the natural light, image processing at night is different from that during the day. First of all, the region of interest (ROI) at night is different from that during the day. The ROI's at night have different shapes and locations than those during the day. Secondly, the extracted features at night are different from those during the day. The extracted features at night are reflections (where the pixel intensity is large), whereas the extracted features during the day are edges (where the pixel intensity changes sharply). For inline parked vehicles (i.e. vehicles parked along a line and the parked-vehicle sensor captures the side image of the parked vehicles), typical extracted features at night include the tail-light reflection, the wheel reflection and the body reflection. For side-by-side parked vehicles (i.e. vehicles parked side-by-side and the parked-vehicle sensor captures the tail/head image of the parked vehicles), typical extracted features at night include the rear/front bumper reflection and the tail/head-light reflection ("/" means "or" here).

BRIEF DESCRIPTION OF THE DRAWINGS

FIG. 8 illustrates the extracted feature on front-parked vehicles at night.

Figure 1:
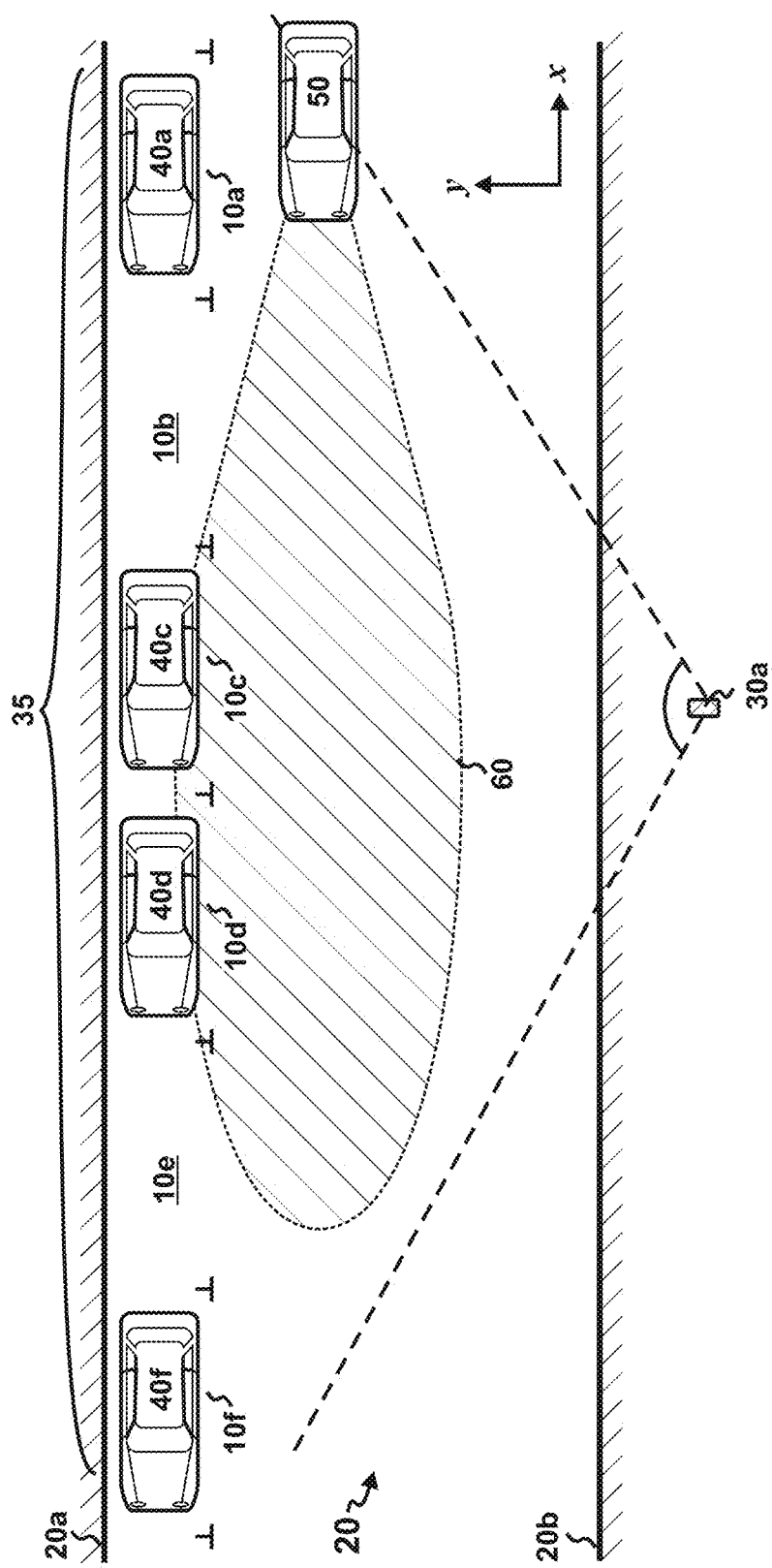
FIG. 1 is a top view of a street with vehicles parked along its side and a moving vehicle passing by these parked vehicles.

It should be noted that all the drawings are schematic and not drawn to scale. Relative dimensions and proportions of parts of the device structures in the figures have been shown exaggerated or reduced in size for the sake of clarity and convenience in the drawings. The same reference symbols are generally used to refer to corresponding or similar features in the different embodiments.

DETAILED DESCRIPTION OF THE PREFERRED EMBODIMENTS

Those of ordinary skills in the art will realize that the following description of the present invention is illustrative only and is not intended to be in any way limiting. Other embodiments of the invention will readily suggest themselves to such skilled persons from an examination of the within disclosure.

Referring now to FIG. 1, a street 20 with several parked vehicles and a passing-by vehicle is shown. The street 20 is along the x-axis and has two curbs 20a, 20b. Along the curb 20a, there are a number of parking spaces (e.g. 10a-10f . . . ). On the opposite curb 20b, a parking-monitoring device 30a is installed to monitor a large parking area 35, which includes the parking spaces 10a-10f. Generally, the device 30a is mounted on a support such as a utility pole or a street-lamp post, which also provides power to the device 30a. To make it easier to detect a parked vehicle, the device 30a is preferably mounted at a position higher than the highest roof of the parked vehicles.

Within the monitored parking area 35, four parking spaces 10a, 10c, 10d and 10f are occupied by the vehicles 40a, 40c, 40d and 40f, respectively, while the other two parking spaces 10b, 10e are vacant. During the day (i.e. under the natural lighting), the states of these parking spaces 10a-10f can be easily monitored by the parking-monitoring device 30a. At night, because these parked vehicles may not have enough lighting for the parking-monitoring device 30a to make reliable detection, the light beam 60 from a moving vehicle 50, which illuminates the parked vehicles while passing by, is used to determine the states of the parking spaces 10a-10f.

Figure 2:
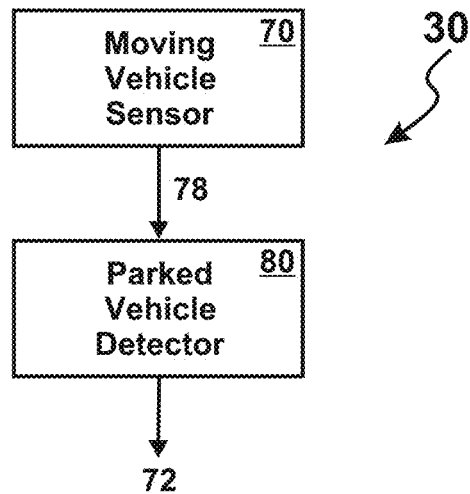
FIG. 2 is a block diagram of a preferred night-detection device for parked vehicles.

Referring now to FIG. 2, a preferred night-detection device 30 for parked vehicles is disclosed. This night-detection device 30 is actually the parking-monitoring device 30a. It takes advantage of the light beam 60 from a moving vehicle 50 which illuminates the parked vehicles while passing by. The night-detection device 30 comprises a parked-vehicle sensor 80 for monitoring a parking area and a moving-vehicle sensor 70 for sensing a moving vehicle around this parking area. After it detects a passing-by vehicle 50, the moving-vehicle sensor 70 sends out a trigger signal 78 to the parked-vehicle sensor 80. Once it receives the trigger signal 78, the parked-vehicle sensor 80 captures the images of the parking area 35 and determines the parking state 72 of each parking space (e.g., 10a-10f). A passing-by vehicle 50 is a moving vehicle within a pre-determined range from the parking area 35. More details on the parked-vehicle sensor 80 and the moving-vehicle sensor 70 are disclosed in FIG. 3 and FIGS. 4A-4C, respectively.

Figure 3:
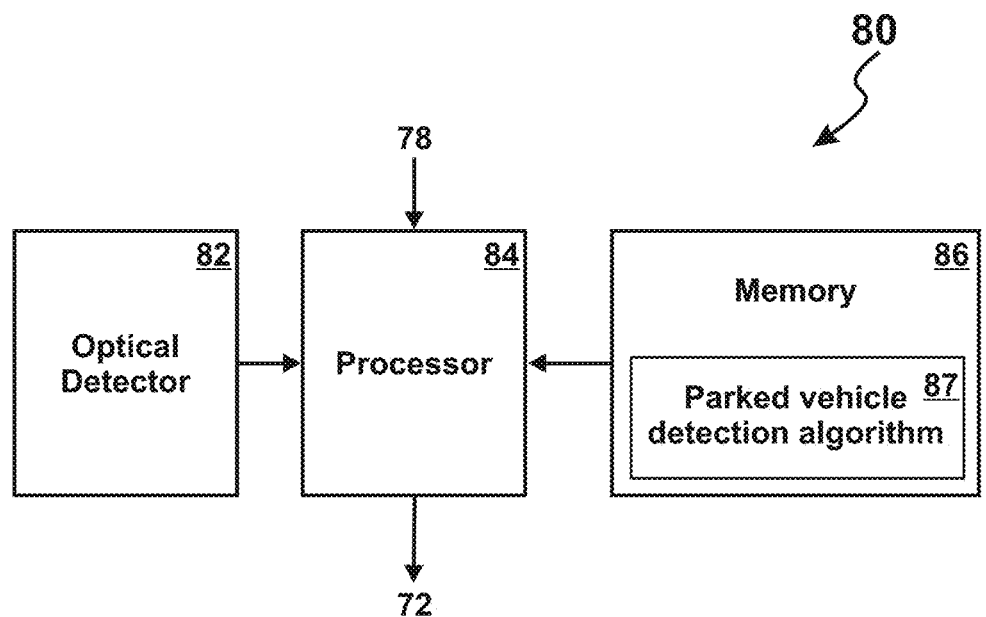
FIG. 3 is a block diagram of a preferred parked-vehicle sensor.

FIG. 3 is a block diagram of a preferred parked-vehicle sensor 80. It comprises an optical detector 82, a processor 84 and a memory 86. The optical detector 82 captures the images of the monitored parking area 35 and it is generally a camera. It may also comprise a number of cameras facing different directions. The processor 84 processes the images captured by the optical detector 82 to determine the parking states. It could be any type of central-processing unit (CPU) and/or digital signal processor (DSP). The memory 86 could be any type of non-volatile memory (NVM), e.g. flash memory. It stores at least a portion of the images captured by the optical detector 82. It also stores an operating system for the parking-monitoring device 80. Preferably, the operating system is an operating system of a smart-phone, e.g. iOS or Android. It further stores at least a parked vehicle detection algorithm 87. This algorithm 87 configures the processor 84 to detect parked vehicles.

Figure 4A:
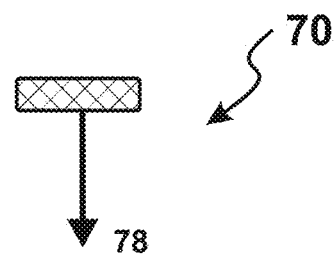
FIGS. 4A-4C disclose several preferred moving-vehicle sensors and moving-vehicle detection methods.
Figure 4B:
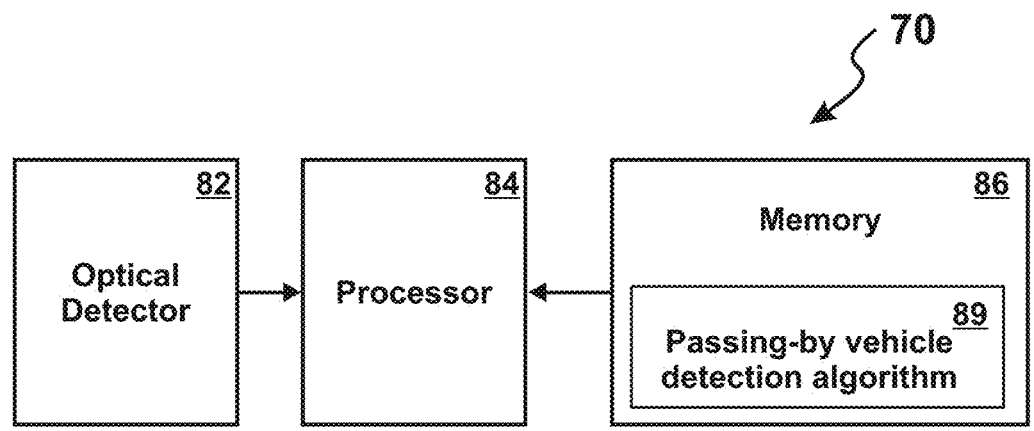
Figure 4C:
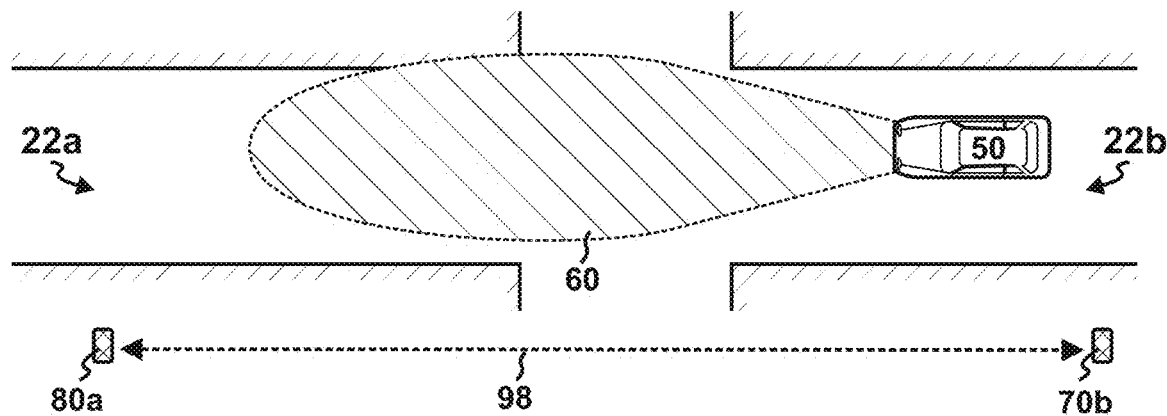

FIGS. 4A-4C disclose three preferred moving-vehicle sensors 70 and moving-vehicle detection methods. In the preferred embodiment of FIG. 4A, the moving-vehicle sensor 70 could be an audio sensor, an optical sensor, or an electromagnetic sensor. The audio sensor listens to the ambient sound change caused by a nearby moving vehicle 50; the optical sensor monitors the ambient light change caused by a nearby moving vehicle 50 (more details disclosed in FIG. 4B); the electromagnetic sensor detects the changes in electromagnetic wave caused by a nearby moving vehicle 50.

FIG. 4B discloses another preferred moving-vehicle sensor 70. It uses the parked-vehicle sensor 80 of FIG. 3 as the moving-vehicle sensor 70. Note that the memory 86 of the parked-vehicle sensor 80 further stores a moving vehicle detection algorithm 89. This algorithm 89 configures the processor 84 to detect an incoming light beam on the street. Once the intensity of this light beam is above a threshold, the moving vehicle is considered in range.

FIG. 4C discloses a third preferred moving-vehicle sensor. For the parked-vehicle sensor 80a monitoring a parking area in the block 22a, the moving-vehicle sensor 70b in an adjacent block 22b are used to provide an advance notice of a passing-by vehicle 50. The moving-vehicle sensor 70b can communicate this advance notice to the parked-vehicle sensor 80a using a wireless means 98, e.g. WiFi or Bluetooth. Note that the parked-vehicle sensor 80a and the moving-vehicle sensor 70b could be a portion of the parking-monitoring device of their respective block. With the advance notice, the parked-vehicle sensor 80a can monitor the parked vehicles more efficiently and more accurately.

Figure 5A:
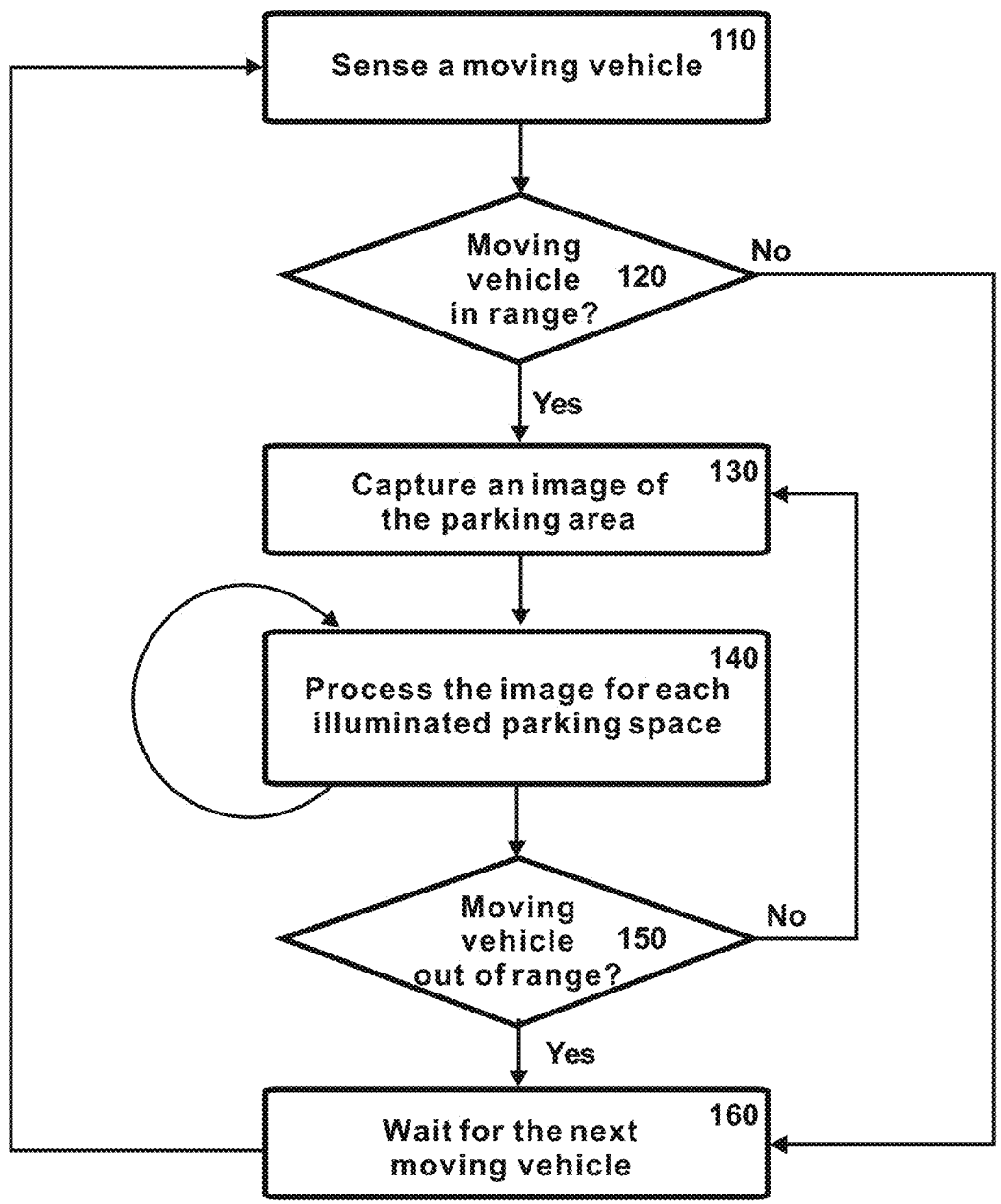
FIGS. 5A-5B are flow charts showing two preferred night-detection methods for parked vehicles.
Figure 5B:
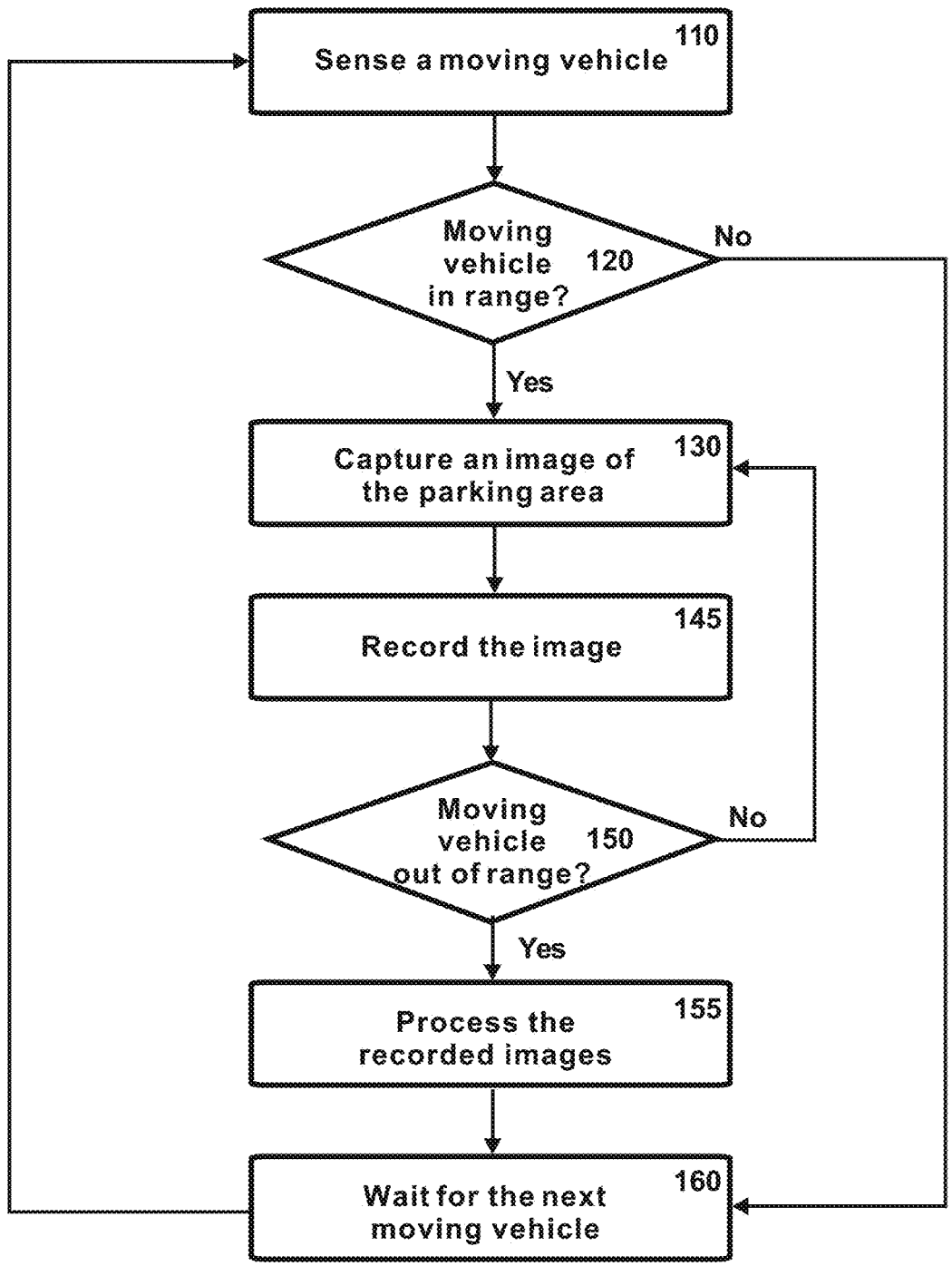

Referring now to FIGS. 5A-5B, flow charts showing two preferred night-detection methods for parked vehicles are shown. In the preferred method of FIG. 5A, the captured images are processed in real time as the moving vehicle 50 is passing the parking area 35. On the other hand, in the preferred method of FIG. 5B, the captured images are processed after the moving vehicle 50 has left the monitored parking area 35.

As is disclosed in FIG. 5A, the first preferred night-detection method includes the following steps. The moving-vehicle sensor 70 senses a moving vehicle 50 (step 110). If the moving vehicle is in range (step 120), the parked-vehicle sensor 80 captures an image of the parking area 35 (step 130). This image is processed for each parking space, particularly for the parking spaces which are illuminated by the light beam 60 of the passing-by vehicle 50 (step 140). Steps 130, 140 are repeated until the moving vehicle 50 is out of range (step 150). Then wait for another moving vehicle (step 160).

Because it has a limited range (with effective range of ~20 meters), the light beam 60 of a passing-by vehicle 50 can only illuminate a small number of the parked vehicles (typically around three vehicles). Considering that the passing-by vehicle 50 can only illuminate the parking area for a few seconds, the parked-vehicle sensor 80 needs to capture at least one image of the parking area 35 every two seconds. This is more frequent than during the day when the parked-vehicle sensor 80 only needs to capture an image every five to ten seconds. Accordingly, for a parked-vehicle sensor 80 with a powerful processor 84, the images can be processed in real time; for a parked-vehicle sensor 80 with a less powerful processor 84, the images can be recorded first and then processed after the moving vehicle 50 is out of range. This is further illustrated in FIG. 5B. When the moving vehicle 50 is in range (step 120), the parked-vehicle sensor 80 only captures the images (step 130) and records them to the memory 86 (step 145), but does not process these images. After the moving vehicle 50 is out of range (step 150), the processor 84 processes these images and determines the states of the parking area 35 (step 155).

Figure 6:
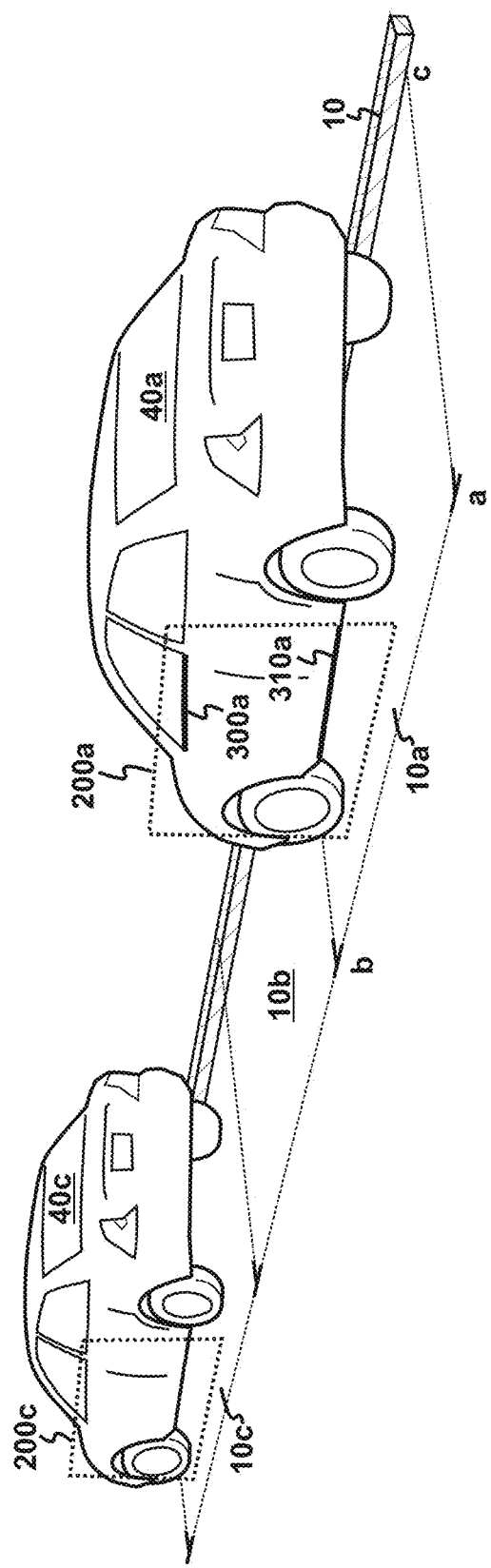
FIG. 6 illustrates the extracted features on inline parked vehicles during the day (prior art)
Figure 7:
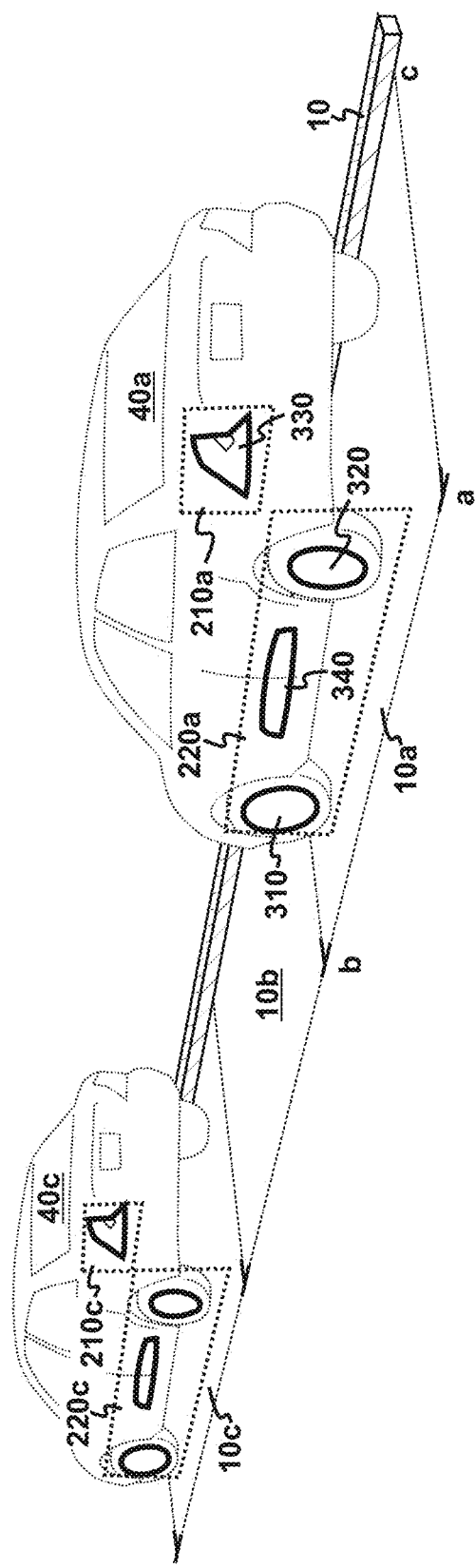
FIG. 7 illustrates the extracted features on inline parked vehicles at night.

Because the parked vehicles are illuminated by the light beam 60 of a passing-by vehicle 50, not by the natural light, image processing at night is different from that during the day. FIGS. 6 and 7 compare these differences, primarily in the areas of region of interest (ROI) and signature features. Here, a ROI is a region in an image that is image-processed to detect if a vehicle is parked in an associated parking space; and a signature feature is a feature on a vehicle indicating that this vehicle is parked in a parking space of interest.

FIG. 6 shows the ROI's 200a, 200c for the vehicles 40a, 40c parked in the parking spaces 10a, 10c along the curb 10 during the day. Because they are parked along a line 10, the vehicles 40a, 40c are inline parked vehicles. Each ROI (e.g. 200a) for each parking space (e.g. 10a) roughly starts from a side line (e.g. "ab") of the parking space (e.g. 10a) and extends upward to cover at least a side window of the vehicle (e.g. 40a). The extracted features in the ROI are signature edges of the vehicle. For an inline parked vehicle, its signature edges include the bottom edge of its body 310a and the bottom edge of its side window 300a. More details on the day detection of parked vehicles are disclosed in U.S. Patent Provisional Application "Occluded Vehicle Detection", App. Ser. No. 61/883,122, filed Sep. 26, 2013.

FIG. 7 shows the ROI's for the inline parked vehicles 40a, 40c at night. Each vehicle (e.g. 40a) has two ROI's (e.g. 210a, 220a). The first ROI 220a covers at least a wheel and a portion of the body of the vehicle 40a, while the second ROI 210a covers the tail-light of the vehicle 40a. The extracted features at night are different from those during the day: the extracted features at night are reflections (where the pixel intensity is large), whereas the extracted features during the day are edges (where the pixel intensity changes sharply). For an inline parked vehicle, its night signature features include the wheel reflections 310, 320, the tail-light reflection 330 and the body reflection 340. Here, a signature reflection can be detected by searching for the pixels whose intensity is larger than a threshold within the ROI.

FIG. 8 shows the ROI's for the front-parked vehicles 40d, 40f at night. The vehicles 40d, 40f are parked in the parking spaces 10d, 10f, respectively, while the parking space 10e is un-occupied. As used herein, a front-parked vehicle (e.g. 40d) is parked in such a way that its head (i.e. its front side) faces the inside of the parking space (e.g. 10d), while its tail (i.e. its back side) faces the outside of the parking space (e.g. 10d). Each vehicle (e.g. 40d) has an ROI (e.g. 230d). The ROI 230d covers two tail lights and at least a portion of the back bumper of the vehicle 40d. For the front-parked vehicle 40d, its night signature features include the tail-light reflections 350d, 360d, and/or the back-bumper reflection 370d. Similarly, for the front-parked vehicle 40f, its night signature edges include the tail-light reflections 350f, 360f, and/or the back-bumper reflection 370f.

While illustrative embodiments have been shown and described, it would be apparent to those skilled in the art that many more modifications than that have been mentioned above are possible without departing from the inventive concepts set forth therein. The invention, therefore, is not to be limited except in the spirit of the appended claims.

What is claimed is:

1. A detecting method for front-parked vehicles at night, comprising the steps of:
    A) sensing by a moving-vehicle sensor if a moving vehicle is within a pre-determined range of a parking area;
    B) capturing at least an image of said parking area by a parked-vehicle sensor when said moving-vehicle sensor detects said moving vehicle;
    C) determining if said parking area is occupied by extracting at least a reflection of at least a tail light or at least a portion of a back bumper from said image by using a light beam from said moving-vehicle sensor.

2. The method according to claim 1, wherein said moving-vehicle sensor is an audio sensor, an optical sensor, or an electromagnetic sensor.

3. The method according to claim 1, wherein said moving-vehicle sensor is located at a same location as said parked-vehicle sensor.

4. The method according to claim 1, wherein said moving-vehicle sensor is located at a different location from said parked-vehicle sensor.

5. The method according to claim 4, wherein said moving-vehicle sensor communicates with said parked-vehicle sensor using a wireless technique.

6. The method according to claim 1, wherein said parked-vehicle sensor comprises an optical detector, a processor and a memory.

7. The method according to claim 6, wherein said optical detector comprises at least a camera.

8. The method according to claim 7, wherein said camera operates more frequently at night than during the day.

9. The method according to claim 6, wherein said memory stores a front-parked vehicle detection algorithm.

10. The method according to claim 6, wherein said memory stores a passing-by vehicle detection algorithm.

\* \* \* \* \*